United States Patent [19]

Ota

[11] Patent Number: 4,481,665
[45] Date of Patent: Nov. 6, 1984

[54] CHARACTER SEGMENTATION METHOD

[75] Inventor: Naoki Ota, Yokohama, Japan

[73] Assignee: Tokyo Shibaura Denki Kabushiki Kaisha, Kanagawa, Japan

[21] Appl. No.: 331,310

[22] Filed: Dec. 16, 1981

[30] Foreign Application Priority Data

Dec. 17, 1980 [JP] Japan ................................ 55-178423

[51] Int. Cl.$^3$ ................................................ G06K 9/16
[52] U.S. Cl. ........................................ 382/48; 382/63; 382/9
[58] Field of Search ............................ 382/1, 48, 63, 9

[56] References Cited

U.S. PATENT DOCUMENTS 3,846,753 11/1974 Spanjersberg ........................ 382/48
4,034,341 7/1977 Isono et al. ............................ 382/48

FOREIGN PATENT DOCUMENTS 53122500 10/1978 Japan .

Primary Examiner—Howard W. Britton
Attorney, Agent, or Firm—Banner, Birch, McKie & Beckett

[57] ABSTRACT

This invention relates to a character segmentation method for use with an optical character reader for sequentially reading postal code, state name and city name postal information, and for generating signals which represent character masks of each character. The system then calculates the gap between each mask and determines if it is greater than an average gap value calculated for all the masks. A determination is also made if a substantially smaller mask (representing a punctuation mark) exists between the two masks. These determinations are used to identify and separate the blocks of information. Once the blocks are identified, the block containing the postal code is classified since it necessarily contains five characters and the two remaining blocks (i.e., state and city) are classified since they, having been scanned in sequence, follow the postal code. Once classified, this information is used to facilitate the character recognition process since standard patterns of an alphabetical nature can be selected when the state name and city name are being recognized, and standard patterns of a numerical nature when the postal code is being recognized.

6 Claims, 14 Drawing Figures

CHARACTER SEGMENTATION METHOD

BACKGROUND OF THE INVENTION

This invention relates to a character segmentation method, and particularly to the character segmentation method which optically reads and recognizes postal address information including postal code, city name and state name.

FIG. 1 shows a known optical character reader for reading the postal code on postal material comprising: a scanner 1, an image signal processing unit 3, a character segmentation unit 4, and a character recognition unit 5. Scanner 1 optically scans the printed area representing the postal code information and produces a scanning signal. The scanning signal is then transformed into electric pattern signals by an image signal processing unit 3. The transformed electric signals, representing postal code signals, are then transmitted to a character segmentation unit 4 which detects the characters and segments of the postal code, and transmits this information to a character recognition unit 5. The character recognition unit recognizes the character of the code by using a known technique, for example, by comparing the characters with standard patterns. The character segmentation unit of the prior art detects and segments only the postal code information.

However, in recent years, it has become desirable, in postal processing, that both the postal code and its related information (e.g., the city name and the state name) be read and checked to determine if the postal code accurately corresponds to the related information. In this way, errors in the postal code can be detected.

In using the prior art system wherein each character is detected and segmented respectively, character recognition processing after the character segmentation becomes very complicated. The complication is due to the inability of the system to distinguish the different types of blocks of characters. Because the city name and the state name are alphabetical and the postal code is numerical, the standard pattern corresponding to these distinct kinds of information must be separately selected. Consequently, the character recognition process becomes very complicated.

SUMMARY OF THE INVENTION

The object of this invention is to provide a character segmentation method which is so designed that the character recognition processing after character segmentation can be performed in a simple manner.

According to this invention each block of address information is detected and classified according to the type of information it contains, and the characters are segmented and read from each distinct block of information.

BRIEF DESCRIPTION OF THE DRAWINGS

This invention can be more fully understood from the following detailed description when taken in conjunction with the accompanying drawings, in which.

DETAILED DESCRIPTION OF THE INVENTION

Figure 2:
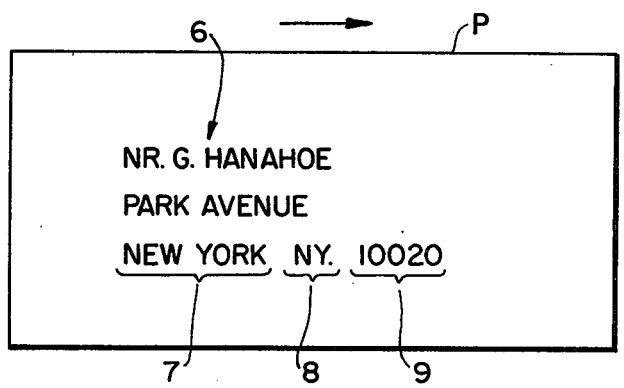
FIG. 2 is a plan view of postal material containing postal code and related information.

FIG. 2 illustrates typical postal material p containing some address information 6. The lowest line of this address information includes the postal code 9 and its related information consisting of the city name 7, and the state name 8. This invention relates to a character segmentation method whereby the city name 7, the state name 8 and the postal code 9 is identified, classified and compared with the desired information recognition.

The city name 7 is classified by a city name block, the state name 8 is classified by a state name block and the postal code 9 is classified by a postal code block. Consequently, the system of this invention can identify and classify the blocks which contain each character, thereby simplifying the character recognition process. Use of these separate blocks to distinguish the information having alphabetical characters and the information having numerical characters permits ready identification and recognition. Since the characters within the city name block and the state name block are alphabetical, this information can be easily compared, using known techniques, to standard pattern information of an alphabetical nature. Further, since the characters within the postal code block are numerical, this information can be easily compared, using known techniques, to standard pattern information of a numerical nature.

Figure 3:
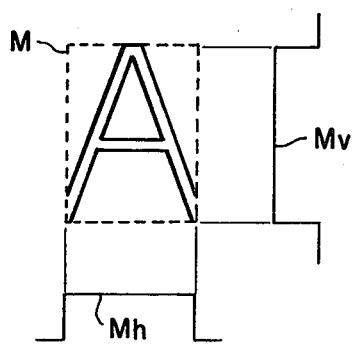
FIG. 3 shows a character mask and two projection mask data.

The blocks are identified to permit easy recognition as shown in FIGS. 3-6. As illustrated in FIG. 3, projection mask data $M_h$ (i.e., horizontal projection mask) and $M_v$ (i.e., vertical projection mask) of each character mask can be produced by character mask generating circuit 22 (FIG. 7) within the character segmentation unit 4 of this invention. However, only the $M_v$ data is utilized by this invention. This data is obtained from the electrical pattern signals supplied by the image signal processing unit 3. This data and its corresponding blocks are then identified by the circuitry within the character segmentation unit.

Figure 4:
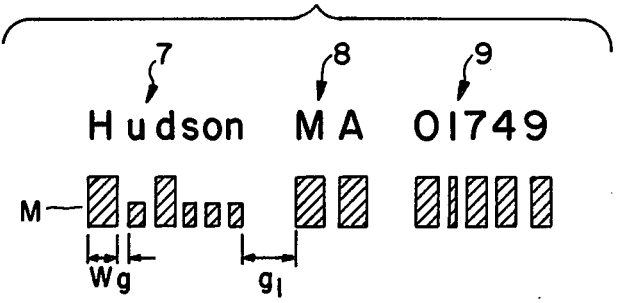
FIGS. 4, 5 and 6 illustrate the various methods which are employed to classify the block character masks according to this invention.

In identifying a block, a check is made of the gap g between two adjacent character masks as illustrated in FIG. 4. This gap is then compared with an average gap value $\bar{g}$ between adjacent character marks as determined for all the characters. If the comparison indicates the gap (e.g., $G_1$ is FIG. 4) is larger than the average value $\bar{g}$, the circuitry thereby determines that the gap occurs between two blocks of characters. This determination results in the identification of a block of characters.

Figure 5:
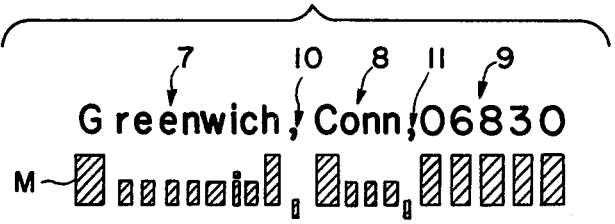
Figure 6:
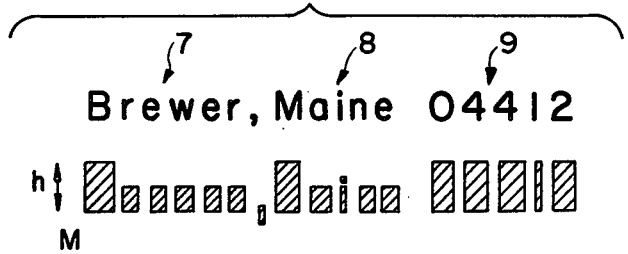

A second method for identifying the block character marks is to detect the presence of punctuation marks such as a comma 10 or a period 11 (see FIG. 5). Since such punctuation separates the distinct blocks of information, this method provides an additional identification check which is utilized in the instant invention with the method of FIG. 4. The punctuation mark method, in part, compares the much smaller mark of such marks with the average height $\bar{h}$ of the heights h of all the character marks (see FIG. 6). After each of these character blocks is identified by the character segmentation unit 4, the specific classification of each block and the character pattern signals for the block are transmitted, by circuit 4, to a character recognition unit 5 for recognition of each character.

Figure 7:
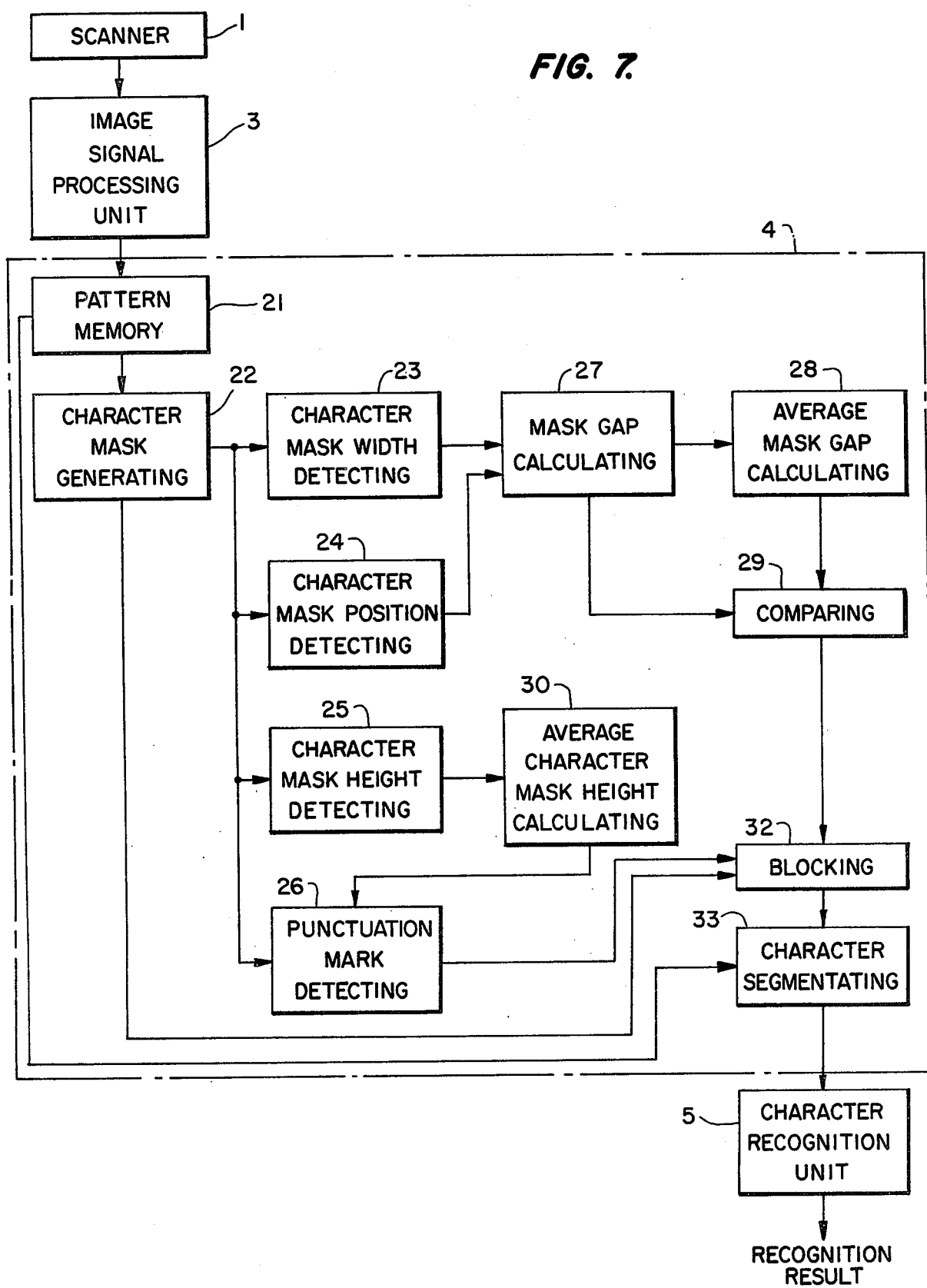
FIG. 7 is a detailed block diagram of a character segmentation unit according to this invention.

Reference is now made to FIG. 7 which shows, in block diagram, the detailed circuitry of the character segmentation unit 4 for identifying and classifying the character blocks by the methods mentioned above.

Figure 1:
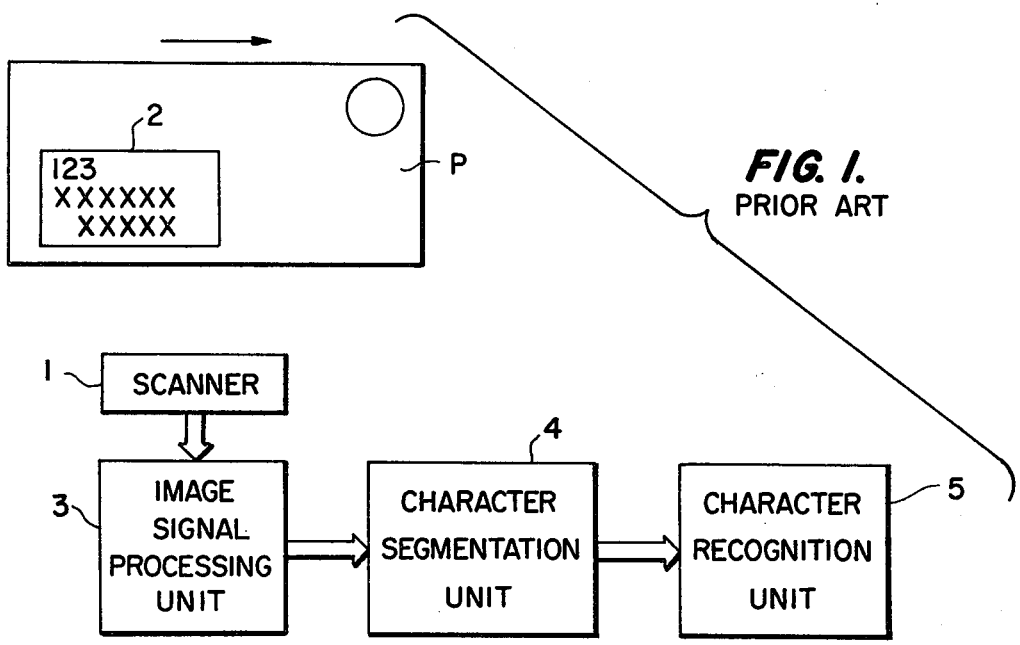
FIG. 1 is a block diagram of a prior art optical character reader.

A known scanner 1 optically scans the address area 2 (see FIG. 1) on postal material P. The output signals of the scanner are supplied to a conventional image signal processing unit 3 for transforming these output signals to pattern signals. These pattern signals are then supplied to character segmentation unit 4 which includes a pattern memory 21 for storing the pattern signals.

These stored signals are then analyzed by circuitry within unit 4 in accordance with the following steps. Character mask generating circuit 22 detects the pattern signals, including signals corresponding to the lowest line of address information (i.e., FIG. 2: 7, 8, 9), and generates vertical projection data of each character, according to the stored pattern signals to represent the character mask M for each character. The operating scanner 1 is shown in U.S. Pat. Nos. 3,846,753 and 4,034,341. The operation of image processing unit 3 and the production of pattern signals and character mask generating circuitry 22 are disclosed in IBM Technical Disclosure Bulletin, Vol. 15, No. 7 (6/72) and Japanese Published Pat. No. 51-36971 (10/13/76).

Figure 8:
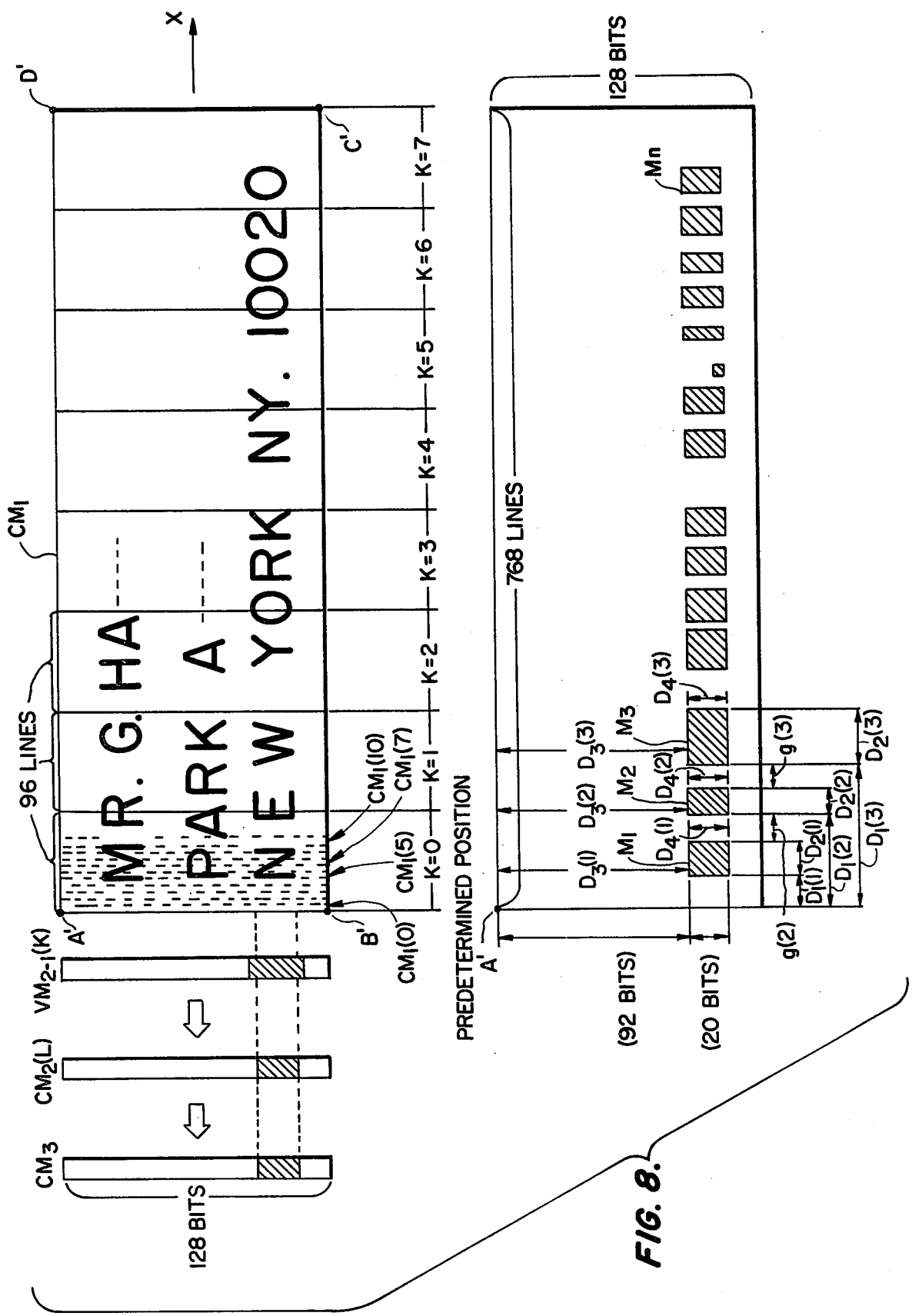
FIG. 8 represents the scanning of the postal character, the resulting pattern memory signals $CM_1(L)$, the separated vertical projection data $M_{2-n}(K)$ and the relationship of the mask data stored in the mask memory with respect to each mask.

The character mask generating circuit 22 transmits the data to a character mask width detecting circuit 23, a character mask position detecting circuit 24, a character mask height detecting circuit 25 and a punctuation mark detecting circuit 26. Circuits 23-25 (see FIG. 7) produce, in part, mask data from the pattern signals and the projection data. The data for each mask, as will be discussed with reference to FIG. 8, is made up of the following four bytes of information: $D_1(n)$; $D_2(n)$; $D_3(n)$; $D_4(n)$, where n is the mask data for mask $M_n$. For example, $D_1(1)$ is the horizontal distance from a predetermined position $A'$ to each left side of mask $M_1$; $D_2(1)$ is the width of masks $M_1$; $D_3(1)$ is the vertical distance from a predetermined position $A_1$ to the upper side of mask $M_1$; and $D_4(1)$ is the height of mask $M_1$. A detailed explanation of the complete operation of these circuits will be made with reference to FIGS. 8, 9, 10 and 12. The character mask position detecting circuit 24 detects the position of each character mask M from a predetermined position assigned for the system. As will be explained with reference to FIG. 8, the predetermined position $A'$ is selected as the end of the scanning sequence. The character mask width detecting circuit 23 detects the width of the character mask M, while the character mask height detecting circuit detects the height of the character mask M.

The outputs of the width detecting circuit 23 and the mask position detecting circuits 24 are supplied to a mask gap calculating circuit 27. Mask gap calculating circuit 27 calculates the gap g between each character mask M on the basis of the position data from the character mask position detecting circuit 24 and the width data from the character mask width detecting circuit 23. An average mask gap calculating circuit 28, receives the output of circuit 27, and calculates the average value $\bar{g}$ of the gaps. A comparing circuit 29 compares the output signal of circuit 27, representing each gap, with the average value $\bar{g}$ and produces an output signal indicating whether or not the gap is larger than the average value $\bar{g}$.

An average character mask height calculation circuit 30, receives the output h of circuit 25, and calculates the average value $\bar{h}$ of all the heights of the character masks. The output of circuit 30 is then supplied to a punctuation mark detecting circuit 26 which utilizes, in part, the average value $\bar{h}$ to determine if a punctuation mark is present. The punctuation mark detecting circuit 26 determines the presence or absence of a punctuation mark, such as comma 10 or period 11, between each character mask. As will be explained with reference to FIG. 12, circuit 26 can distinguish the character mask of a punctuation mark since its corresponding mark is much smaller than the other character masks. The circuit compares the height of the punctuation mask with the average height $\bar{h}$ of all the marks. Also, the circuit determines if the vertical distance to the center of an immediately preceeding mask is less than the vertical distance to the upper side of the punctuation mask.

A blocking circuit 32 temporarily stores the comparative result of comparing circuit 29 and the output signal of the punctuation mark detecting circuit 26. Circuit 32 identifies the character blocks by utilizing the outputs of circuits 29 and 26. For example, when the mask existing between two other masks is detected to be a punctuation mark, circuit 32 can, thereby, determine that the other masks belong to different blocks. Further, for example, when the output of circuit 29 indicates that the gap value g between two masks is largers than the average gap value $\bar{g}$, circuit 32 can, thereby, determine that these masks belong to different blocks. The characters masks M are then separated at that point, and transmitted to the character segmentation circuit 33. Consequently, character masks M are identified for each separate block of postal code 9, state name 8 and city name 7, and then transmitted to the character segmentation circuit 33.

Each identified block information is then classified in the character segmentation circuit 33 in the following manner. The address information in the lowest line described on the postal material P comprises, in sequence, the postal code 9, the state name 8 and the city name 7. This information is scanned in that sequential order. As a result, blocking circuit 32 determines if the first identified block to be classified is the postal code block by determining if the block contains five (5) masks since all U.S. postal codes have five characters. The second identified adjacent block is then classified as the state name block and the third identified adjacent block is then classified as the city name block. As a result, each block of information is identified and assigned a classification. The character segmentation circuit 33 also segments the characters within each classified block transmitted from circuit 32 in a conventional manner. When the blocked character mask M is transmitted, the corresponding character pattern signals from pattern memory 21 are segmented into characters corresponding to its separate classified block, and then transmitted to the character recognition unit 5. The operation of circuit 33 will be explained in more detail with reference to FIG. 14.

The character recognition unit 5 selects the standard pattern memory corresponding to the type of block information (i.e., numerical or alphabetical) supplied from character segmentating circuit 33. Recognition unit 5 then recognizes the particular segmented characters transmitted by selecting and using standard pattern memory corresponding to this type of information. That standard pattern information is then compared with the segmented characters within that block. For example, if the block information corresponds to the postal code block, a numerical standard pattern memory is selected. If the block information corresponds to either the state name block or the city name block, an alphabetical standard pattern memory is selected.

Figure 9:
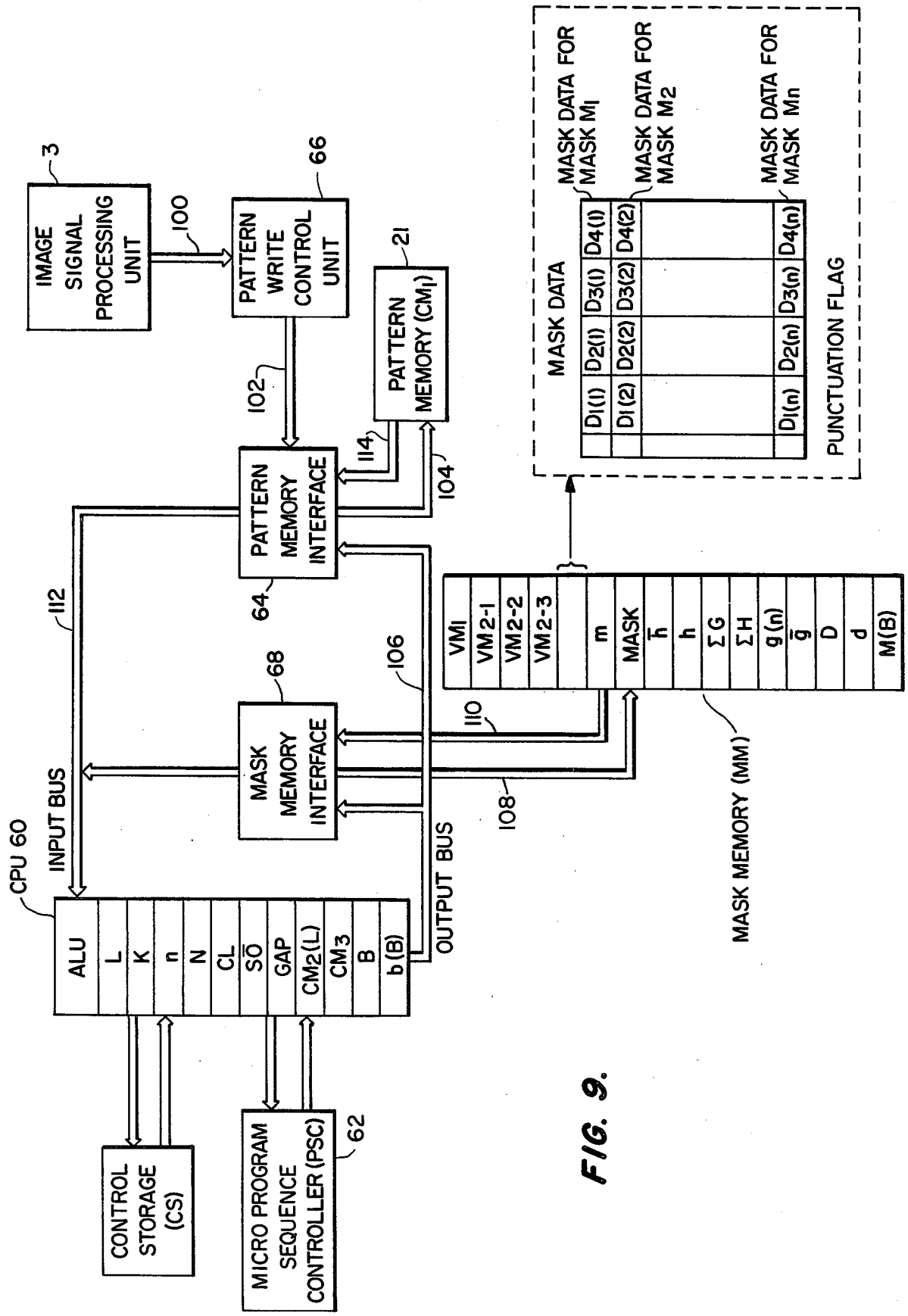
FIG. 9 shows a block diagram of the computer utilized to produce the instant invention including the various registers and counters for performing the certain operations of the circuits in FIG. 7.

Reference is now made to FIGS. 8 and 9 to explain the scanning and storage of the pattern signals and character mask data. FIG. 8 shows the vertical scanning of the three lines of address information from C' to D' while the letter is transported in the horizontal direction X. Scanning takes place such that 768 vertical lines are scanned including the last line from B' to A'. A' represents the end of scanning and is also the predetermined position for determining character mask positions. See prior art methods discussed in U.S. Pat. Nos. 4,034,341 and 3,846,341. The signals are stored in the pattern memory 21 which is also shown in FIGS. 8 and 9 as $CM_1$. Pattern memory $CM_1$ is divided into 8 memory portions (i.e., K=0 to K=7), wherein each portion comprises 96 lines. Each line, in the vertical direction, comprises 128 bits or 8 words. Each within a memory portion is designated as L, where L=1 to 96. $CM_1(L)$, therefore, is a binary value that represents whether information signals are present in the pattern memory at line L. For example, as shown, there are no signals present at $CM_1(1)$ but signals are present at $CM_1(5)$; consequently, $CM_1(1)=0$, but $CM_1(5)=1$.

These signals are then used to generate vertical projection signals which are stored in the mask memory ($VM_1$) of the computer shown in FIG. 9. See prior art methods discussed in IBM Technical Disclosure Bulletin, Vol. 15, No. 7 (6/72) and Japanese Published Patent No. 51-36971 (10/13/76). This computer is used to perform the circuit functions in FIG. 7, of circuits 23-30 and 32-33. The registers, counters, control units, and flow charts for performing these functions will be defined and explained below. The three lines of address information in mask memory for the projected signals are designated as $VM_{2-m}$, where m is one of the three horizontal lines of information, m=1 to 3. $VM_{2-3}$ refers to the line of address information (e.g., Mr. G. Hanahoe); $VM_{2-2}$ refers to the second line (e.g., Park Avenue); and $VM_{2-1}$ refers to the first line (e.g., New York, N.Y. 10020). Consequently, the designation $VM_{2-1}(k)$, shown in FIG. 8, refers to the value of the vertical projection data along the first line of information at the memory position k.

BASIC OPERATION OF THE COMPUTER SYSTEM OF FIG. 9

(A) System Construction

1. CS (Control Storage): The Micro Program is stored in this memory.
2. Micro Program Sequence Controller (PSC): This controller 62 is used for controlling the micro program stored in the CS.
3. Register and ALU (Arithmetic and Logic Unit): This CPU 60 is included in, for example, the Am 2901 chip manufactured by Advance Micro Device Co. The Register and ALU performs the functions of the following circuits in combination with the CS and PSC 62: mask generating 22, character mask width detecting 23, character mask position detecting 24, character mask height detecting 25, punctuation mark detecting 26, mask gap calculating 27, average height calculating 30, average mask gap 28, comparing 29, blocking 32, and segmentation 33.
4. Image Signal Processing Unit 3: This unit is used for converting the address information obtained by optical scanner 1 to electrical pattern signals.
5. Pattern Write Control Unit 66: This unit temporarily stores the address information converted into pattern signals in 16 bits (1 word unit) and then transmits the signals to Pattern Memory 21 through Pattern Memory Interface 64.
6. Pattern Memory 21: This memory store the address information as pattern information $CM_1$.
7. Mask Memory (MM): The projection data, the character mask position data, the character mask width data, the character mask height data etc. are stored in this Memory.

(B) Signal and Data Flow

The address information which has been converted to electrical pattern signals by image processing unit 3 is transferred by BUS 100 and stored in the Pattern Write Control Unit 66 in 16 bits (1 word unit). The address information data is obtained as 16 bits; this data is sequentially stored in the designated address of the Pattern Memory 21 through BUS 102 and 104. The Pattern Memory Interface 64 designates the address wherein the 16 data bits should be stored in Pattern Memory 21. The address information for such designations are obtained from the Register and ALU (CPU 60) through the Output BUS 106.

Data between Register and ALU, Pattern Memory 21 and MM are transmitted through the Mask Memory Interface 68 and Pattern Memory Interface 64. Output data from CPU 30 to MM and Pattern Memory 21 are transmitted through output BUS 106, BUS 108 and 104. Input data from MM to CPU 60 is transmitted through BUS 110 and 112. Input data from pattern memory 21 to CPU 60 is transmitted through BUS 112 and 114.

DEFINITIONS OF REGISTERS AND COUNTERS WITHIN CPU 60 AND MM FOR PERFORMING THE FUNCTIONS OF CIRCUITS 23-30 AND 32-33 (FIG. 7)

(A) Character Mask Width and Height Detecting (Circuits 23, 25) and Character Mask Position Detecting (Circuit 24)

m (counter): "m" signifies the horizontal line of the mask. In the instant application, m=1, 2 or 3. In FIG. 8, the value m=1 designates the first horizontal line of information (i.e., city, state and postal code—New York NY 10020).

L (line counter): scanning lines are stored in this line counter as the pattern memory is obtained. "L" is used for obtaining the position within each memory portion along the horizontal direction.

MASK (Mask counter or Register): The accumulated count value of the masks as they are analyzed are stored in "MASK". In FIG. 8, when the first line is completed, fifteen masks have been analyzed and count "15" is stored in "MASK".

K (counter): "K" designates each of the eight memory positions of the pattern memory (K=0-7). In FIG. 8, "K=0" means the left most portion in pattern memory 21.

$VM_1$ (Register): "$VM_1$" contains the data for the vertical projection signals.

$VM_{2-m}$ (Register): "$VM_{2-m}$", where m is the horizontal lines of information (M=1 to 3), contains the vertical projection signals for each horizontal line of information.

$CM_2(L)$ (Register): "$CM_2(L)$" contains the data value representing the height of the portion of the character at line L. (see, e.g., FIG. 8). $CM_2(L)$ is the result of an "AND" operation of comparing $CM_1(L)$ and $VM_{2-m}(K)$—FIG. 8 shows the result for m=1.

$CM_3$ (Register): Data of character height, namely the height of the projection mask are stored in register "$CM_3$." It is used for obtaining the height of each mask. (see e.g., FIG. 8).

n (Counter): "n" signifies each particular mask along a horizontal line. In FIG. 8, for example, if n=1 then $M_1$ will be processed, if n=2 then $M_2$ will be processed.

$D_1(n)$ (Register or Horizontal positioning information): In FIGS. 8, $D_1(1)$, $D_1(2)$, $D_1(3)$ etc. are designated as the horizontal distance from the predetermined position A' to the left side of each respective mask $M_1$, $M_2$, $M_3$, etc.

$D_2(n)$ (Register or Width information): In FIG. 8, $D_2(1)$, $D_2(2)$, $D_2(3)$, etc. designate the width value of each mask $M_1$, $M_2$, $M_3$, etc.

CL (Clock Counter): Clock pulses are counted; the count is used for obtaining the location of a mask in the vertical direction.

$\overline{SO}$ (Register): "$\overline{SO}$" is used for temporarily transferring the content of "$CM_3$."

$D_4(n)$ (Register or Height information): In FIG. 8, $D_4(1)$, $D_4(2)$, $D_4(3)$, etc. designate the height value of each respective mask $M_1$, $M_2$, $M_3$, etc.

$D_3(n)$ (Register or Vertical position information): In FIG. 8, $D_3(1)$, $D_3(2)$, $D_3(3)$, etc. designate the vertical distance from the predetermined position A' to the upper side of each respective $M_1$, $M_2$, $M_3$, etc.

(B) Mask Gap and Average Gap Calculating (Circuits 27, 28) and Average Mask Height Calculating (Circuit 30)

$\Sigma G$ (Gap accumulation register): Is used for accumulating the gap value between one mask and the next mask. The obtained accumulation value is used for calculating the average gap value.

$\Sigma H$ (Height accumulation register): Is used for accumulating the height value (i.e., $D_4$) of each mask. The obtained accumulation value will be used for calculating the average height value.

GAP (Flip Flop): "GAP" is the designation for a Flip Flop included in CPU 60.

g(n) (Register): stores the calculated value of the gap between a mask and its immediately preceeding adjacent mask.

$\overline{g}$ (Register): Stores the average value of the gap g(n).

h (Register): Temporarily stores the content of $D_4(n)$.

(C) Punctuation Mark Detecting Circuit (Circuit 26)

$\overline{h}$ (Register): Stores the average value of the mask heights.

D (Register): The results of performing the following calculation is stored in "D": $D_4(n-1)/2$. In FIG. 8, when n is 2, the one-half the value of the height of mask $M_1$ is stored in "D."

d (Register): The results of performing the following calculation is stored in "d": $D+D_3(n-1)$. In FIG. 8, when n is 2, the vertical distance between the predetermined point A' and the center of mask $M_1$ will be stored in "d."

(D) Blocking and Character Segmentating (Circuits 32 and 33)

B (Counter): "B" designates the identified blocks of information. For example, in FIG. 8, when B is "1", the left most block is identified (i.e., New York). When B is "2", the next block is identified (i.e., NY). When B is "3", the next successive block is identified (i.e., 10020).

b(B) (Counter): "b(B)" accumulates the number of masks for one block. For example, in FIG. 8, if the content of b(3) is 5, then there are 5 masks in block 3. The circuitry determines if the first block on the right (usually block 3) has five masks (i.e., b(B)=5); if so, then this block is the postal code since all U.S. postal codes have five characters.

M(B) (Register): Stores the total number of masks for each block.

Mask data (Register): Content of $D_1(n)$, $D_2(n)$, $D_3(n)$ and $D_4(n)$, corresponding to each mask, are stored in "Mask data."

FLOW CHARTS OF CIRCUIT OPERATIONS FOR PERFORMING THE FUNCTIONS OF CIRCUITS 23-30 AND 32-33 (FIG. 7)

A. Character Mask Width and Height Detecting (Circuits 23, 25) and Character Mask Position Detecting (Circuit 24)

Figure 10:
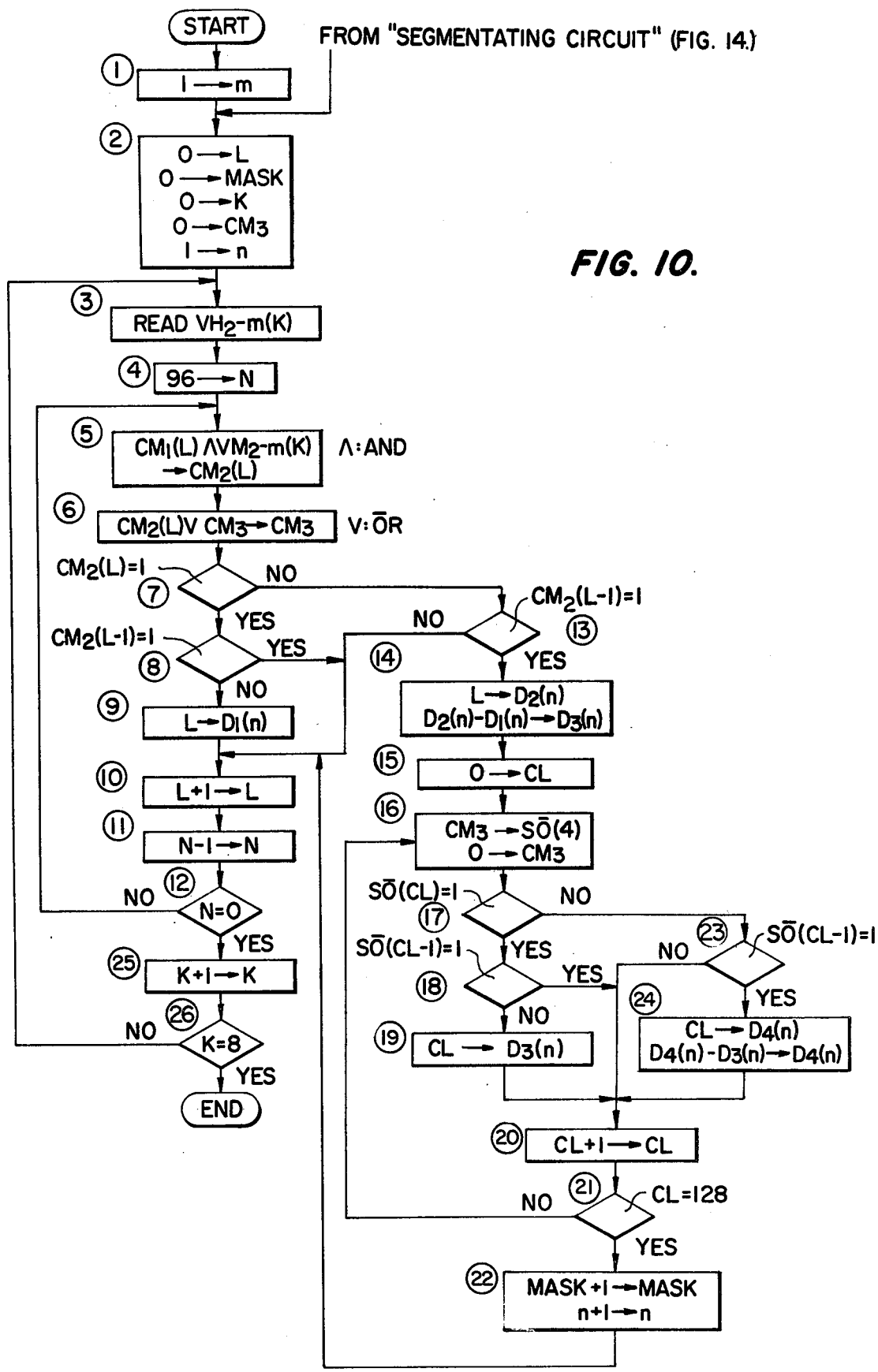
FIG. 10 shows the flow chart of character mask width, height and position detecting circuits.

The following steps explain these operations with reference to FIG. 10 of the drawings:

(1): Vertical Mask $VM_{2-m}$ is separated from Vertical Mask projection data $VM_1$. Vertical Mask $VM_{2-m}$, where m is "1", is processed.

(2) Line Counter "L", Mask Counter "MASK" and Counter "K" which divides Pattern Memory $CH_1$, are cleared. Register "$CM_3$" is reset. Position information representing Mask n is set to "1." "L," "MASK," "K," "N," and "n" now have available storage positions in Register of CPU 60 and MM. "$CM_3$" is stored in Mask Memory "MM."

(3) $VM_{2-1}(0)$ stored in Mask Memory (MM), is read out and supplied to Register of CPU 60.

(4) "96" (scanning lines) is set in Counter "N," representing the scanning lines in one memory portion; "N" is stored in the Register of CPU 60.

(5) First line $CM_1(0)$ is read out from first separate portion (K=0) of Pattern Memory (PM), then $CM_1(0)$ makes an "AND" operation with Vertical Mask $VM_{2-1}(0)$; the result of this operation is stored in CPU Register $CM_2(0)$.

(6) Vertical Mask Register $CM_3$ makes an "OR" operation with $CM_2(0)$ and the result is stored in $CM_3$.

(7) $CM_2(0)$ is checked to determine whether it has a "1" signal level (i.e., "Black" information). If it has a "1" signal, the operation goes to step (8); if it does not have a "1" signal, the operation jumps to step (13).

(8), (13): Steps (8), (13) checks whether the previous line has "Black" information.

Step (8) checks whether or not the line changed from "White" to "Black." If the line changes from "White" to "Black," the operation goes to step (9). However, if the line has not changed from "White" to "Black" (i.e., "Black" is continued), the operation will jump to step (10).

Step (13) checks whether or not the line has changed from "Black" to "White." If the line changed from "Black" to "White," the operation will go to step (14). However if the line has not changed from "Black" to "White" (i.e., "White" is continued), the operation will jump to step (10).

(7), (8), (13): Referring to FIG. 8, since $CM_1(0)$, and $CM_1(1)$–$CM_1(4)$ do not have "Black" information, step (7) will go to step (13) and then to step (10). Because $CM_1(5)$ has "Black" information for the first time, step (7) will go to step (8) and then to (9). Further, because $CM_1(5)$–$CM_1(9)$ has continuous "Black" information, step (7) will go to step (8) and then to step (10). Since in $CM_1(10)$ "Black" has changed to "White", step (7) will go to step (13) and then to step (14).

(10): Line counter "L" is counted up by one.

(11): Counter "N" is counted down by one.

(12): Counter "N" checks whether or not "N" is "0". That is, it determines whether the comparisons between the first separated Vertical Mask $VM_{2-1}(0)$ and each of the 96 lines within the K=0 portion of the Pattern Memory are finished. If the comparison is finished (i.e., N=0), step (12) will go to step (25). If, however, the comparison is not finished, step (12) will go to step (5) and the above operation will be repeated.

Because $CM_1(1)$–$CM_1(4)$ has only "White" information, steps (5) to (6) to (7) to (13) to (10) to (11) to (12) will be repeatedly performed. Since in $CM_1(5)$, "Black" information is obtained for the first time, step (5) will go to steps (6) to (7) to (8) to (9) to (10) to (11) to (13).

(9) Step (9) is performed when "White" information changes to "Black" information. In step (9), the content of Line Counter "L" is stored in Register $D_1(n)$ included in the Mask Memory as the coordinate representing the starting point of Mask "$M_1$," corresponding to character "N." For $CM_1(5)$, $D_1(1)$ will be 5.

Because $CM_1(6)$–$CM_1(9)$ has continuously only "Black" information, steps (5) to (6) to (7) to (8) to (10) to (11) to (12) will be repeatedly performed.

In $CM_1(10)$, no "Black" information is obtained, thus step (5) will go to steps (6) to (7) to (13) to (14).

(14): Step (14) is performed when the "Black" information changes to "White" information. In step (14), the content of Line Counter "L" is stored in Register $D_2(n)$ of the Mask Memory as the co-ordinates representing the finishing point of Mask "M", corresponding to character "N." Further $D_2(n) - D_1(n)$ is calculated. The register $D_2(n)$ will be rewritten with the calculated result. This result is the Character Width Information of Mask "$M_1$" which is stored in $D_2(n)$. For $CM_1(10)$, $D_2(1)$ will be 5 representing the width of Mask "$M_1$."

Hereafter, step (14) will go to the following steps for performing the Character Height detecting flow:

(15): Clock Counter "CL" is cleared.

(16): As $CM_3$ made an "OR" Operation with $CM_1(L)$ in step (6) (with reference to FIG. 8), a vertical mask corresponding to Mask "$M_1$" had been obtained and was stored in $CM_3$. The content of $CM_3$ is then transferred to Register $SO(CL)$; at the same time $CM_3$ is cleared for detecting the next vertical mask.

(17): Output of Shift Register $SO(CL)$ is checked whether or not it has a "1" corresponding to "Black" information. If it has "Black" information, step (17) will go to step (18). If not "Black" information, step (17) jumps to step (23).

(18), (23): Output of $\overline{SO}(CL)$ representing the previous bit along the same vertical line (i.e., CL−1) is checked whether or not it has "Black" information (i.e., a "1" present). Step (18) checks whether or not the content of $CM_3$ is changed from "White" to "Black". If it has changed from "White" to "Black", step (18) will go to step (19). If it continues to have "Black" information, step (18) will jump to step (20).

Step (23) checks whether or not the content of $CM_3$ is changed from "Black" to "White". If it changed from "Black" to "White", step (23) will go to step (24). If it continues to have "White" information (i.e., a "0" present), step (23) will jump to step (20).

(17), (18), (23): Steps (17), (18), (23) perform operations similar to those described in the above-mentioned steps (7), (8), (13). In FIG. 8, for example, the 1st bit to 92nd bit are "White", the 93rd bit to 112th bit are "Black", and the 113th bit to 128th bit are "White". From the 1st bit to the 92nd bit, step (17) will go to step (23) to (20) as "White" is continued. At the 93rd bit, step (17) will go to step (18) to (19) as the content of $CM_3$ is changed from "White" to "Black".

From the 94th bit to the 112th bit, step (17) will go to step (18) to (20) as "Black" continues in register $CM_3$. At the 113th bit, step (17) will go to step (23) to (24) as the content of $CM_3$ is changed from "Black" to "White".

From the 114th bit to the 128th bit, step (17) will go to step (23) to (20) as "White" continues in register $CM_3$.

(20): Clock counter "CL" is counted up by one.

(21): Step (21) checks whether or not "CL" is 128. That is, it checks whether or not all positions in the vertical direction have been analyzed. If the check is not finished, step (21) will back to step (16). If the check is finished, step (21) will go to step (22).

The following represents the operational flow when the Horizontal Mask ($M_h$—FIG. 3) changes from "Black" to "White" (e.g. $CM_1(10)$—FIG. 8). These operations are used to calculate $D_3(n)$ and $D_4(n)$:

(i) From the 1st bit through the 92nd bit: Step (16) to (17) to (23) to (20) to (21) and back to step (16) are repeatedly performed as "White" continues between the 1st bit and the 92nd bit.

(ii) AT the 93rd bit: Step (17) will go to step (18) to (19) as the content of $CM_3$ is changed from "White" to "Black". In step (19), the content of Counter "CL" is stored in Register $D_3(n)$ included in the Mask Memory as the co-ordinate representing the starting point of the "Black" information in the vertical direction. The starting point of Mask "$M_1$" is $D_3(1)=92$, as "CL"=92 for the 93rd bit.

(iii) From the 94th bit through the 112th bit: Steps (16) to (17) to (18) to (20) to (21) and back to step (16) are repeatedly performed as "Black" continues between the 94th bit and the 112th bit.

(iv) At the 113th bit: Step (17) will go to step (23) to (24) as the content of $CM_3$ is changed from "Black" to "White". In step (24), the content of Counter "CL" is stored in Register $D_4(n)$, included in the Mask Memory, as the co-ordinate representing the finishing point in the vertical direction of "Black" information in $CM_3$. The height value of the Mask is calculated in accordance with starting point $D_3(n)$ and finishing point $D_4(n)$; the height value (i.e., $D_4(n) - D_3(n)$ is then stored in Register $D_4(n)$. The finishing point of Mask "$M_1$" is $D_4(1)=112$ as $CL=112$, and the height value of Mask "$M_1$" is $D_4(1)=20$ at the 113th bit.

(v) From the 114th bit to the 128th bit: Steps (16) to (17) to (23) to (20) to (21) and back to step (16) are repeatedly performed as "White" continues. However, at the 128th bit, step (21) will go to step (22), as $CL=128$. At step (22), the starting point of "Black" in the horizontal direction, the width of "Black" in the horizontal direction, the starting point of "Black" in the vertical direction and the height of "Black" in the vertical direction have already been obtained as $D_1(n)$, $D_2(n)$, $D_3(n)$ and $D_4(n)$, respectively. Step (22) counts the Masks. For the first Mask "$M_1$", MASK=1, and n is incremented to n=2. Step (22) will go to step (10) after step (22) is performed.

The above steps of FIG. 10 have analyzed the first mask ($M_1$). These steps are then repeated for the succeeding masks $M_2$, $M_3$, etc.

(25) After the 96 lines in the first portion of the Pattern Memory (PM) (i.e., K=0) are compared with Vertical Mask $VM_{2-m}$, step (25) will be performed. Step (25) counts up the Counter "K" by one.

(26): If K does not equal "8," all operations for all the portions have not been performed, thus, step (26) will go to step (3). As a result, the next portion of divided PM and MM will be check in the same manner as mentioned above for the K=0 portion. When K equals "8", all operations for all the portions have been performed. As a result, Positioning information, Width information and Height information for each mask along the first line of information (m=1) have been calculated. Therefore, the information of Mask $M_1$, $M_2$, etc. are stored in Mask Memory with the following co-ordinates: Mask $M_1(D_1(1), D_2(1), D_3(1), D_4(1))$; Mask $M_2((D_1(1), D_2(1), D_3(1), D_4(1))$, etc.

(B) Flow Chart for the Mask Gap, Average Gap and Average Mask Height Calculations (i.e., Circuits 27, 28 and 30)

Figure 11:
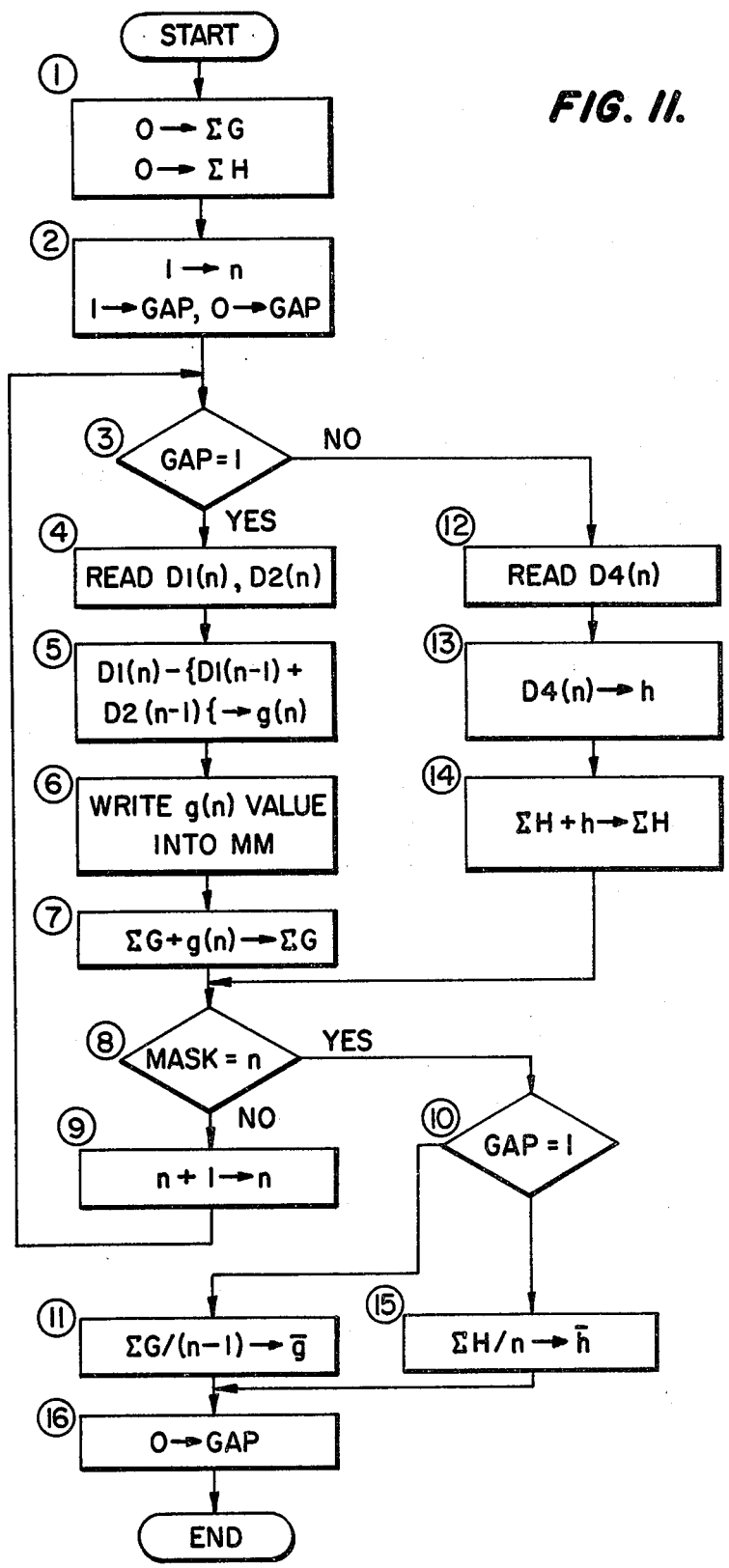
FIG. 11 shows the flow chart of mask gap, average gap and average height calculating circuits.

The following operational steps are made with reference to FIG. 11:

(1): The gap accumulating register ($\Sigma G$) and height accumulating register ($\Sigma H$) are cleared.

(2): Counter n is set to "1" representing the first mask to be analyzed (i.e., $M_1$). The Flip-Flop GAP is set to "1" for the gap operations and set to "0" for the height operations.

(4)-(7): Steps (4)-(7) represent the mask gap calculating routine. These operations calculate $D_1(n) - [D_1(n-1) + D_2(n-1)]$ which represents the gap between the mask and the previous mask.

(12)-(14): Steps (12)-(14) represent the mask height calculating routine. $D_4(n)$ is the height data stored in MM. This data is added to the accumulated values $\Sigma H$, in step (14), for later use in calculating the average height.

(11), (15): Steps (11) and (15) calculate the average gap and average height, respectively.

(C) Flow Chart for Punctuation Mark Detecting Circuit (i.e., Circuit 26)

Figure 12:
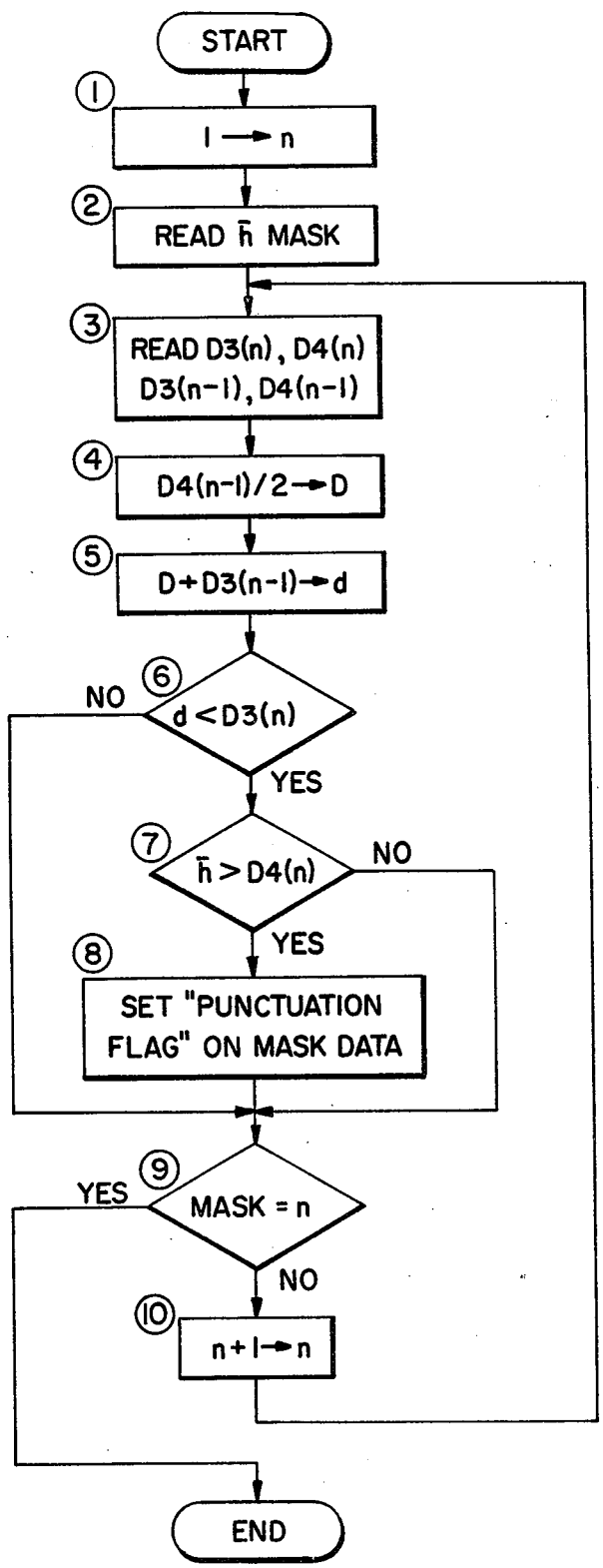
FIG. 12 shows the flow chart of the punctuation mask detecting circuit.

The following operational steps are made with reference to FIG. 12:

(1): The counter n is set to "1" representing the first mask $M_1$.

(2): The average height $\bar{h}$ and MASK is read from MM and transferred to the register of CPU 60. The MASK data was obtained from step (22) of FIG. 10.

(3): The following position and height information for the mask and the previous mask are read from MM: $D_3(n)$, $D_4(n)$, $D_3(n-1)$, $D_4(n-1)$ (4): The calculated result of $D_4(n-1)/2$ is stored in register D. This value is one half the height of the previous mark.

(5): The calculated result of $D + D_3(n-1)$ is stored in register d. This value is the vertical distance from point A' to the center of the previous mask.

(6): Determination is made whether the vertical distance to the center of the previous mark is less than the distance to the upper surface of the examined mask.

(7): A further determination is made whether the average height of all the masks is greater than the height of the examined mask.

D. Flow Chart for Blocking Circuit and Comparing Circuits (i.e., Circuits 29 and 32)

Figure 13:
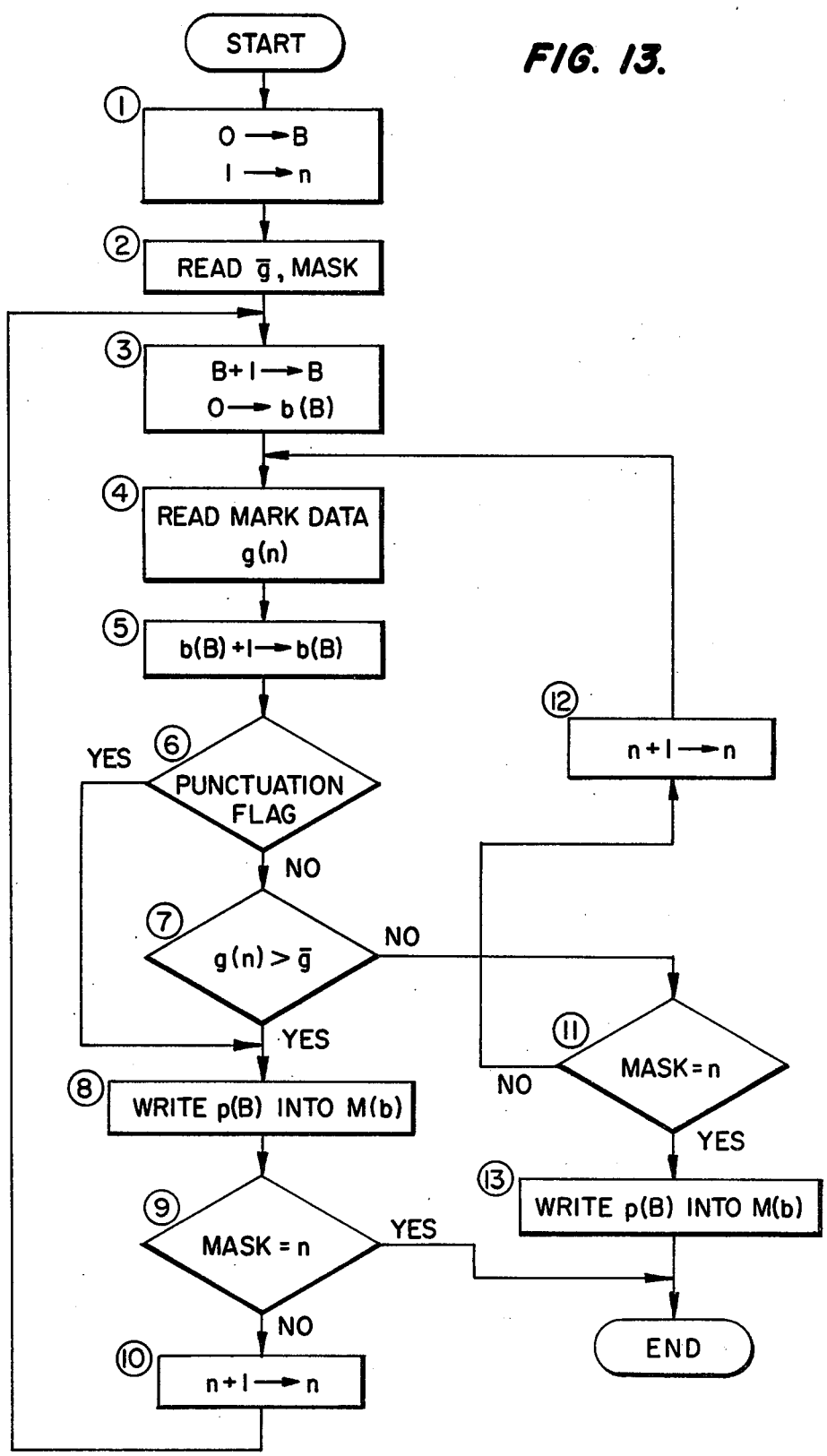
FIG. 13 shows the flow chart of blocking circuit and comparing circuit.

The following operational steps are made with reference to FIG. 13:

(1): Counter B is cleared and counter n is set to "1." Counter B is used for counting the number of blocks.

(2): Average gap $\bar{g}$ and MASK are read from MM and transferred to the register of CPU 60. MASK data was obtained in step (22) of FIG. 10.

(4): Mask data (i.e., ($D_1(n)$, $D_2(n)$, $D_3(n)$, $D_4(n)$, punctuation flag) and gap g(n) are read from MM. Mask data comprises positioning information, width information and height information.

(6): The punctuation flag of the Mask data is checked. The flag was set in step (8) of FIG. 12.

(7): The average gap $\bar{g}$ is compared with gap g(n)

(8), (13): Blocking. The number of masks in one block is stored in MM.

(E) Flow Chart for Segmentation Circuit (i.e., Circuit 30)

Figure 14:
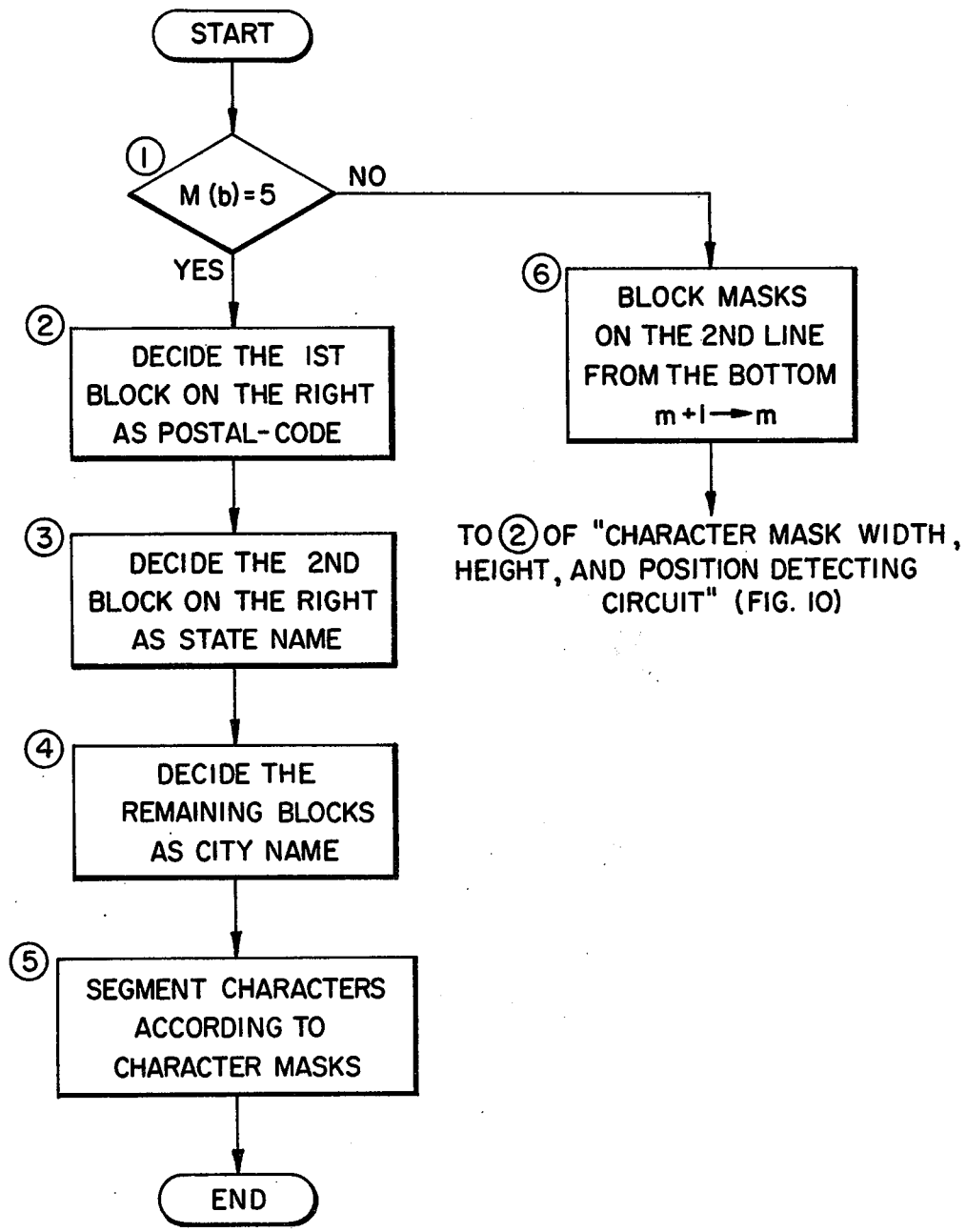
FIG. 14 shows the flow chart of the segmentation circuit.

The following operational steps are made with reference to FIG. 14:

(1): A check is made whether the last block is a postal code. That is, whether M(b)=5, since the U.S. postal card has five characters.

(2): If the first block (for m=1) is not the postal code, the next line is checked (i.e., m=2).

As mentioned above, according to this invention, the address information described on the postal material is identified and then classified according to the type of address information. The character information, with each classified block, is then segmented and supplied to a character recognition unit. Because the standard pattern memory corresponding to the type of classified information is select (i.e., numerical or alphabetical), the character recognition processing is simplified.

Since certain obvious changes may be made in the illustrated embodiments without departing from the scope of the invention, it is intended that all matter contained herein be interpreted as illustrative and not in a limiting sense.

I claim:

1. A method for facilitating the automatic recognition of optically scanned and read characters from within separate sequentially scanned blocks of written information, said method comprising the steps of:
   predetermining the classification of a first block of written information and a next successive block of written information of said separate sequentially scanned blocks according to the types of information contained therein;
   optically and sequentially scanning said separate blocks of information and generating a representative output signal for each of said characters;
   retrievally storing said output signals;
   reading each of the stored output signals in the order scanned and determining the end of said first block of information and the beginning of said next successive block of information;
   classifying each of the read output signals of said first block in accordance with the predetermined classification of said first block; and
   processing the output signals of said first block by a character recognition circuit for identifying the characters within said first block.

2. The method of claim 1 further comprising the step of classifying each of the read output signals of each successive blocks in accordance with the predetermined classification for each block and processing the output signals of each successive blocks by a character recognition circuit for identifying the characters within each successive blocks.

3. The method of claim 1 wherein the step of determining the end of said first block of information and the beginning of said next successive blocks of information comprises comparing the gap length between adjacent characters to the average gap length of all characters.

4. The method of claim 1 wherein the step of determining the end of said first block of information and the beginning of said next successive blocks of information comprises determining the presence of a punctuation mark between two adjacent characters.

5. The method of claim 1 wherein the step of determining the ends of said first block of information and the beginning of said next successive blocks of information comprises:
   comparing the gap length between adjacent characters to the average gap length of all characters, and
   detecting the presence of a punctuation mark between two adjacent characters.

6. The method of claim 1, 2, 3, 4, or 5 wherein each respective block of information is classified according to whether alphabetical or numerical characters are contained therein.

* * * * *